Patented Jan. 15, 1952

2,582,265

UNITED STATES PATENT OFFICE 2,582,265

SYNTHETIC RESINS FROM NATURAL POLYHYDROXY PHENOLS

Kenneth Potter Monroe, Boston, Mass., assignor to Standard Dyewood Company, Medford, Mass., a corporation of Massachusetts No Drawing. Application July 14, 1950, Serial No. 173,941

11 Claims. (Cl. 260—47)

The present invention relates to the manufacture of useful and novel synthetic resins from natural polyhydroxy phenols, such as the various types of catechol tannins, and more particularly, quebracho extract.

It has long been known that the catechol type of tanning materials contain, or largely consist of, natural polyhydroxy phenolic materials, which have at least three hydroxyl groups, although these are not necessarily attached to the same phenyl group or benzene ring. It has also been proposed in the past to take advantage of the presence of such hydroxyl groups for the formation of synthetic resins, as by the condensation of such tanning materials with aldehydes, such as formaldehyde. The comparatively high reaction velocity of the nuclear hydrogen atoms in such compounds, however, made it very difficult to control the reaction, with the result that mostly insoluble and infusible products resulted, and that, therefore, no really useful products would be formed. Some advantage of this type of reaction was taken during World War II to produce molding compounds, which would serve as substitutes for the more carefully made phenolic types of resins. However, the difficulty of controlling the condensation and subsequent polymerization made these compounds too erratic to permit them to find a market subsequent to the exigencies of the war.

The present invention radically differs from these prior proposals, in that a permanently soluble resinous product is produced, which lends itself to the preparation of various coating compositions, such as may be employed for the coating of leather, and cloth, paper, etc., having many of the characteristics of natural shellac, for which it forms an excellent substitute.

It is therefore one of the objects of the present invention to produce useful, organic-media-soluble synthetic resins from natural polyhydroxy phenolic materials, such as are exemplified by quebracho extract.

It is a further object of the present invention to provide a useful process for the conversion of natural polyhydroxy phenolic materials, exemplified by the catechol type of tanning materials, as for instance quebracho extract, into shellac substitutes.

A further object is to provide a process for the successive etherification of, for example, quebracho extract with a monohalogen lower fatty acid and with an aralkyl halide.

Other objects of the present invention will become manifest from the further description hereinbelow.

The present invention is predicated upon the reactiveness of the hydroxyl groups of natural polyhydroxy phenolic substances, such as catechol types of tanning materials, for instance quebracho extracts, with halogen lower fatty acids, such as the chloroacetic acids, or bromoacetic acids, or the corresponding propionic acid derivatives, to produce corresponding carboxy-alkyl lower-fatty acids, this being accomplished in an alkaline medium, there also being sufficient alkali present to neutralize the hydrochloric acid which results from the reaction. The products thus formed may then be further reacted, or etherified, with an aralkyl halide, for instance with benzyl halide or one of its known equivalents, thereby forming the sodium salt of the desired resin. Such sodium salt may then be recovered from the solution by acidification of the latter, whereby the desired resin will be precipitated in water-insoluble form, so that it may be recovered by filtration, followed by drying and grinding.

The theories and reactions which underlie the present invention may be illustrated as follows, using the arbitrary designation "T" to represent the main group of the tannin involved. "T" thus stands for a group which, according to the best available information, has about the following configuration:

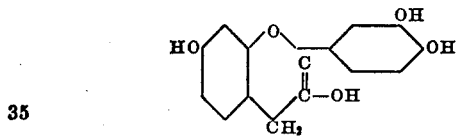

It will be seen that this has at least three phenolic hydroxyl groups, one being found on the left-hand (as written) phenyl group, and the other two being found, in the ortho positions relative to each other, in the right-hand phenyl group. There is also another hydroxyl group attached to a secondary carbon. For purposes of simplification, the fourth hydroxyl group will be disregarded, and the formula could thus be written as:

T(OH)$_3$

The final compounds obtained are complex ethers of the T group, having the probable formulas of:

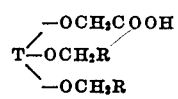

where R is an aromatic nucleus.

It is also possible to produce complex ethers having the probable formula:

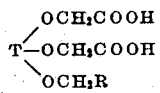

where R, again, is an aromatic nucleus.

The first of these compounds could properly be designated as a mono-carboxy-alkyl diaralkyl ether of quebracho ("T"), and the second as a where R, again, is an aromatic nucleus.

The first step in the reaction is to convert the quebracho extract (i. e. a natural polyhydroxyl phenol having at least three hydroxyl groups) into the corresponding carboxy-alkyl ether by the action thereon of the alkali salt of a halogen lower fatty acid, such as chloro- or bromo-acetic acid or the corresponding chloro- or bromo-propionic acid, this being done in the presence of enough sodium hydroxide, or other alkali hydroxide, to neutralize the formed hydrochloric acid. Thus one mol of the disodium salt of T, i. e.:

is treated with one mol of monochloroacetic acid:

$$ClCH_2.COOH$$

whereby, in the presence of enough sodium hydroxide, it is converted into the sodium salt:

This sodium salt is dissolved in enough sodium hydroxide to yield the tri-sodium salt:

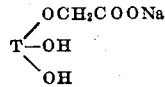

which latter is then reacted, in the presence of enough sodium hydroxide, with an aralkyl halide, for instance benzyl chloride, thus:

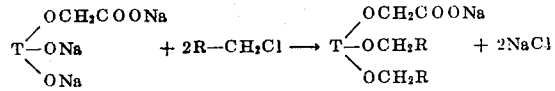

The resulting solution is then rendered acid with hydrochloric or sulfuric acid or the like, thereby liberating the desired end-product which is:

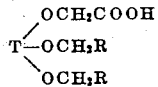

i. e. the monocarboxy-alkyl-bi-aralkyl ether of "T."

If the di-carboxy-alkyl monoaryl compound is to be made, the molecular proportions of the respective reagents are correspondingly modified, but the fundamental reactions are the same.

The compounds thus produced are characterized by being in the form of pale yellow to brownish resins, soluble in various organic solvents, particularly well in mixtures of aromatic hydrocarbons and aliphatic alcohols, such as benzene or toluene, and methyl or ethyl alcohol. In this form they may be formulated into highly serviceable coating compositions or varnishes.

The finished compounds can be described as above indicated, in the form of their probable structural formulae, but it is to be understood that the actual compounds may consist of polymers thereof, the formulae being therefore merely exemplificative and descriptive, and not intended to limit the present invention in any way.

In order to illustrate the details as to the manner of producing the compounds of the present invention, the following actual examples are given, but here again it is to be distinctly understood that the amounts may be varied, and that the examples are purely illustrative of one good method of procedure.

*Step A.*—1280 grams of a quebracho extract containing about 50% of solids, about 3% of which is sodium bisulphite, are poured into a 4 liter beaker which is placed in a water bath and is also equipped with means so that the contents of the beaker may be cooled. The beaker is also provided with an agitator. 640 ml. of tap water are added to the quebracho extract in the beaker, the mixture being stirred for about five to ten minutes until homogeneous. In the meantime, in a separate container, 229 grams of sodium hydroxide are dissolved in 250 ml. of water which thereby becomes heated, making it necessary to cool the resulting solution to room temperature.

In another vessel 253 grams of monochloroacetic acid are weighed out. While the beaker is cooled, and with vigorous mechanical agitation, the sodium hydroxide solution is poured into the solution of the quebracho extract at such a rate that the temperature of the reacting mixture does not exceed about 40° C. After all of the sodium hydroxide solution has thus been added and the stirring has been continued for about five to ten minutes so as to insure the completion of this phase of the process, there are then incrementally added the 253 grams of the monochloroacetic acid, the addition being so controlled that the temperature of the reacting mixture does not exceed about 40° C.

After all of the material has thus been incorporated, the temperature of the mixture is gradually raised to about 70° to 75° C. and held there for two hours while the stirrer is kept in operation. At the end of this two hour period the temperature of the mixture is still further raised say to about 90° to 95° C. and held within that range of temperature for about thirty minutes. At the end of this time there will have formed the quebracho monophenoxyacetic acid sodium salt. The amount of sodium hydroxide used in this first step is not only sufficient to neutralize the sodium bisulphite present in the original quebracho extract, but also is sufficient to neutralize the hydrochloric acid which is formed as the by-product of the reaction with the monochloroacetic acid.

The second stage of the process is carried out as follows:

*Step B.*—The product produced in Step A is poured from the beaker in which it was made into a 5 liter 3-neck flask equipped with a reflux condenser and an efficient mechanical agitator. This flask is also provided with means to permit it to be cooled or heated, and the reaction is begun by agitating the mixture and bringing it by means of a water bath, or the like heating-means, to a temperature of about 45° to 50° C. In the meantime, and in another container, 213 grams of sodium hydroxide have been dissolved in 250 ml. of water, while in still another container 677 grams of benzyl chloride have been weighed out, for example in a bottle. After the material in the 5 liter flask has been stirred at about 45° to 50° C. for about ten or fifteen minutes, all of the sodium hydroxide solution is added and the stirring continued for from five to ten minutes, whereafter, and with continued vigorous agitation, all of the benzyl chloride is poured into the reacting mixture, whereafter the temperature of the reacting mixture is raised to about 55° to 60° C. and held within this temperature range for about ten to fifteen minutes.

The temperature of the reacting mixture is then further raised say to about 70° to 75° C. During this stage the benzylation of the material proceeds, causing a pronounced pick-up in viscosity in the reaction mixture at about the middle point of the reaction, the mass finally thinning down markedly as there ensues a separation of the sodium salt of the finished product which separates out, much as does soap, as a discrete separate liquid phase.

After the two hour heating period at 70° to 75° C. the temperature of the mixture is further raised to about 90° to 95° C. and the agitation continued within this temperature range for about one hour which completes the synthesis.

The flask is then emptied while still hot and the soap, as well as the brine which accompanies it, is poured as quickly as possible into a porcelain tray, wherein the soap will solidify on cooling.

It is found that some of the soap quite often stubbornly adheres to the flask but may be removed therefrom by placing the flask under agitation in a water bath, and adding a reasonable amount of water and stirring at about 70° to 75° C. As the soap is quite soluble in hot water, this will remove it, but it is comparatively insoluble in the brine.

*Step C.*—The third step, which is the liberation of the desired resin, is carried out as follows:

The brine, which floats above the solidified soap, is poured off and only the soap employed for the next step of the process. The acidification may be for example carried out in a 5 gallon enamel lined container which is provided with an efficient mechanical agitator. It is a convenience to acidify the yield of soap from two batches prepared as hereinabove described, and the rest of the description is predicated upon proportions of two such batches.

Thus, into the container there may be poured 4 to 6 liters of cold water, and about 1 kilogram of cracked ice. There are then added 750 ml. of concentrated (36%) hydrochloric acid and the mixture vigorously stirred, and, while continuing the agitation there is then added the sodium soap from two batches, in reasonably small increments or lumps, the agitation being continued at room temperature, or slightly below room temperature due to the presence of the ice, for about three to four hours. This liberates the desired resin as the final product, yielding about 1980 grams thereof. The resin is removed from the solution by filtration, as for example by filtering it through a suction funnel using a glass fabric or similar acid resisting material as a filter medium. The resin is washed on the filter substantially free from excess hydrochloric acid and sodium chloride. The product, after washing, may be placed on porcelain trays and dried at moderate heat to a constant weight. The finished product is, as already mentioned in this case, considered to be the quebracho mono-carboxy-alkyl acid dibenzyl ether.

By correspondingly modifying the amounts of the monochloroacetic acid, for example by doubling it, it is possible to prepare the quebracho dicarboxyalkyl monobenzyl ether, in which case of course the amount of benzyl chloride used is reduced to one half.

Self-evidently, also, the amounts of sodium hydroxide are correspondingly modified, this being entirely within the expected skill of the operator, and therefore a detailed description of the making of the dicarboxy-alkyl monobenzyl ether would be redundant.

I claim:

1. Process of making a synthetic resin which comprises etherifying quebracho tannin with not more than about two molecular equivalents of chloroacetic acid in an alkaline medium, and then etherifying the compound thus formed with not more than about two molecular equivalents of benzyl chloride.

2. Process of producing a resinous material which comprises dissolving quebracho extract in an aqueous solution of sodium hydroxide, reacting the resulting solution with not substantially more than two molecular equivalents of sodium chloroacetate, then adding not substantially more than two molecular equivalents of benzyl chloride and continuing the reaction, acidifying the resulting solution to liberate the thus formed water-insoluble resinous material, and recovering the latter as the desired product.

3. Process of producing a synthetic resin, which comprises etherifying at least one phenolic hydroxyl group of a catechol type of tanning agent by means of an alpha mono-halogen saturated fatty acid having from two to three carbon atoms, and in which the halogen is from the group consisting of chlorine and bromine, by reaction in an alkaline medium with not exceeding about two molecular equivalents of said acid, and etherifying at least one of the remaining phenolic hydroxyl groups by reaction with an aralkyl halide in an alkaline aqueous medium.

4. Process of producing a synthetic resin, which comprises etherifying at least one phenolic hydroxyl group of a catechol type of tanning agent by means of an alpha mono-halogen saturated fatty acid having from two to three carbon atoms, and in which the halogen is from the group consisting of chlorine and bromine, by reaction in an alkaline medium with not exceeding about two molecular equivalents of said acid, and etherifying at least one of the remaining phenolic hydroxyl groups by reaction with a benzyl halide in an alkaline aqueous medium.

5. Process of producing a synthetic resin, which comprises etherifying at least one phenolic hydroxyl group of quebracho tannin by reaction with not exceeding about two molecular equivalents of alpha chloroacetic acid in an alkaline medium, and etherifying at least one of the remaining phenolic hydroxyl groups by reaction with benzyl chloride in an alkaline aqueous medium.

6. As a new composition of matter, a carboxy-alkyl aralkyl ether of a catechol type of tanning agent, the carboxy-alkyl group thereof containing two to three carbon atoms.

7. As a new composition of matter, a carboxy-alkyl aralkyl ether of quebracho tannin, the carboxy-alkyl group thereof containing two to three carbon atoms.

8. As a new composition of matter, the mono-carboxy-alkyl dibenzyl ether of quebracho tannin, the carboxy-alkyl group thereof containing two to three carbon atoms.

9. As a new composition of matter, the di-carboxy-alkyl mono-benzyl ether of quebracho tannin, the carboxy-alkyl groups thereof containing two to three carbon atoms.

10. A resinous composition having the probable formula $$T \begin{matrix} \diagup OCH_2COOH \\ -OCH_2COOH \\ \diagdown OCH_2R \end{matrix}$$

wherein R is an aryl radical, and T represents the residue of a natural polyhydroxy catechol type of tannin with the phenolic hydroxyl radical removed.

11. A resinous composition having the probable formula $$T \begin{matrix} \diagup OCH_2COOH \\ -OCH_2R \\ \diagdown OCH_2R \end{matrix}$$

wherein R is an aryl radical, and T represents the residue of a natural polyhydroxy catechol type of tannin with the phenolic hydroxyl radical removed.

KENNETH POTTER MONROE.

No references cited.